(12) United States Patent
Li et al.

(10) Patent No.: US 8,327,882 B2
(45) Date of Patent: Dec. 11, 2012

(54) WATER FAUCET WITH JOYSTICK CARTRIDGE

(75) Inventors: Keping Li, Xiamen (CN); Xinlu Lan, Xiamen (CN); Feng Zou, Xiamen (CN)

(73) Assignee: Xiamen Lota International Co., Ltd., Xiamen (CN)

( * ) Notice: Subject to any disclaimer, the term of this patent is extended or adjusted under 35 U.S.C. 154(b) by 1222 days.

(21) Appl. No.: 11/985,558

(22) Filed: Nov. 15, 2007

(65) Prior Publication Data

US 2009/0126811 A1     May 21, 2009

(51) Int. Cl.
     *F16K 11/078*      (2006.01)
(52) U.S. Cl. .................................................. 137/625.4
(58) Field of Classification Search ............ 137/625.17, 137/625.4
See application file for complete search history.

(56) References Cited

U.S. PATENT DOCUMENTS

| | | | |
|---|---|---|---|
| 3,324,884 A | 6/1967 | Dornaus | |
| 3,433,264 A | 3/1969 | Parkison | |
| 3,533,436 A | * 10/1970 | Parkison | ................. 137/359 |
| 3,667,503 A | 6/1972 | Farrell et al. | |
| 3,736,959 A | 6/1973 | Parkison | |
| 3,965,936 A | 6/1976 | Lyon | |
| 4,088,153 A | * 5/1978 | Paasikivi | ............... 137/625.17 |
| 4,243,063 A | 1/1981 | Parkison | |
| 4,362,186 A | 12/1982 | Parkison et al. | |
| 4,378,029 A | * 3/1983 | Parkison | ................. 137/625.4 |
| 4,513,781 A | 4/1985 | Nikolayczik | |
| 4,617,965 A | * 10/1986 | Lorch | ............... 137/625.17 |
| 4,621,659 A | 11/1986 | Pawelzik | |
| 4,657,045 A | 4/1987 | Kitamura | |
| 4,682,626 A | 7/1987 | Bergmann | |
| 4,715,406 A | 12/1987 | Kress | |
| 4,736,772 A | 4/1988 | Ostertag et al. | |
| 4,738,281 A | 4/1988 | Limet et al. | |
| 4,738,393 A | 4/1988 | Bergmann et al. | |
| 4,765,368 A | 8/1988 | Mutti et al. | |
| 4,768,749 A | 9/1988 | Oberdörfer | |
| 4,770,208 A | 9/1988 | Stella | |
| 4,796,666 A | 1/1989 | Bergmann | |
| 4,883,090 A | 11/1989 | Kitamura et al. | |
| 4,932,438 A | 6/1990 | Kitamura et al. | |
| 4,941,506 A | 7/1990 | Bergmann | |
| 4,941,509 A | 7/1990 | Orlandi | |

(Continued)

*Primary Examiner* — John Fox
(74) *Attorney, Agent, or Firm* — McDermott Will & Emery LLP (57) ABSTRACT

The invention provides a water faucet including a novel joystick mixing cartridge with internal structures that provide a direct path for water to be discharged from the faucet. The faucet includes a main body portion, a discharge segment and a handle that an operator actuates to deliver water at a desired temperature through the discharge segment. The cartridge includes a housing defining an internal chamber and a lower disk positioned within the chamber. The lower disk has a cold water inlet, a hot water inlet and a mixed water outlet. An intermediate disk is positioned adjacent the lower disk and includes a recessed mixing cavity extending inward from a lowermost wall. The intermediate disk includes a dual lobe sealing element that extends radially inward from the lowermost wall to provide the mixing cavity with an arcuate configuration. An upper disk is positioned adjacent the intermediate disk and a seat is positioned adjacent the upper disk within the chamber. A joystick extends through the seat and the housing for connection with a faucet handle. When an operator actuates the handle and joystick, the intermediate disk is moved within the chamber whereby the position of the mixing cavity relative to the hot and cold water inlets and the water outlet is varied to deliver water at the desired temperature.

8 Claims, 8 Drawing Sheets

U.S. PATENT DOCUMENTS

| | | | |
|---|---|---|---|
| 4,960,154 A | 10/1990 | Dagiantis | |
| 4,971,102 A | 11/1990 | Orlandi | |
| 4,986,306 A | 1/1991 | Ferrari | |
| 5,080,134 A | 1/1992 | Orlandi | |
| 5,095,934 A | 3/1992 | Iqbal | |
| 5,100,565 A | 3/1992 | Fujiwara et al. | |
| 5,114,886 A | 5/1992 | Tsukada | |
| 5,118,418 A | 6/1992 | Roussel | |
| 5,213,134 A | 5/1993 | Orlandi | |
| 5,303,736 A | 4/1994 | Orlandi | |
| 5,331,997 A | 7/1994 | Bosio | |
| 5,386,852 A | 2/1995 | Bosio | |
| 5,402,827 A | 4/1995 | Gonzalez | |
| 5,417,242 A | 5/1995 | Goncze | |
| 5,490,540 A | 2/1996 | Vom Dahl et al. | |
| 5,538,041 A | 7/1996 | Gänzle | |
| 5,609,188 A | 3/1997 | Oberdörfer | |
| 5,735,312 A | 4/1998 | Schneider | |
| 5,794,650 A | 8/1998 | Nikolayczik | |
| 5,806,552 A | 9/1998 | Martin, Jr. | |
| 5,839,464 A | 11/1998 | O'Hara et al. | |
| 5,857,489 A | 1/1999 | Chang | |
| 5,887,620 A | 3/1999 | Niwa et al. | |
| 5,893,386 A | 4/1999 | Caria et al. | |
| 5,901,387 A | 5/1999 | Fan | |
| 5,927,597 A | 7/1999 | Bolgár et al. | |
| 5,934,321 A | 8/1999 | Miya et al. | |
| 5,983,938 A | 11/1999 | Bowers et al. | |
| 6,019,132 A | 2/2000 | Knapp | |
| 6,029,699 A | 2/2000 | Granot | |
| 6,032,686 A | 3/2000 | O'Hara et al. | |
| 6,131,611 A | 10/2000 | Knapp | |
| 6,209,581 B1 | 4/2001 | Gyözö | |
| 6,296,017 B2 | 10/2001 | Kimizuka | |
| 6,321,786 B2 | 11/2001 | Schumacher | |
| 6,363,969 B1 | 4/2002 | Schneider | |
| 6,386,233 B1 | 5/2002 | Magocsi | |
| 6,390,128 B1 | 5/2002 | Tung | |
| 6,394,127 B1 | 5/2002 | Creswell et al. | |
| 6,439,581 B1 | 8/2002 | Chang | |
| 6,484,753 B1 | 11/2002 | Shimizu et al. | |
| 6,517,720 B1 | 2/2003 | Aldred et al. | |
| 6,557,770 B2 | 5/2003 | Mace et al. | |
| 6,634,380 B2 | 10/2003 | Bartkus et al. | |
| 6,796,544 B1 | 9/2004 | Chen | |
| 6,805,151 B1 | 10/2004 | Chang | |
| 6,840,278 B2 * | 1/2005 | Chen | 137/625.17 |
| 6,892,761 B2 | 5/2005 | Chen | |
| 6,920,899 B2 | 7/2005 | Haenlein et al. | |
| 6,935,568 B2 | 8/2005 | Mace et al. | |
| 6,959,731 B2 | 11/2005 | Bartkus et al. | |
| 6,966,335 B2 | 11/2005 | Chen | |
| 6,981,693 B1 | 1/2006 | Chang | |
| 7,007,717 B2 | 3/2006 | Lin | |
| 7,040,348 B2 | 5/2006 | Bolgär et al. | |
| 7,044,162 B2 | 5/2006 | Bolgär et al. | |
| 7,063,106 B2 | 6/2006 | Knapp | |
| 7,080,790 B2 | 7/2006 | Lorch | |
| 7,108,012 B2 | 9/2006 | Rosko et al. | |
| 7,114,515 B2 | 10/2006 | Sponheimer et al. | |
| 7,134,452 B2 | 11/2006 | Hiroshi et al. | |
| 7,174,916 B2 | 2/2007 | Chang | |
| 7,185,676 B2 | 3/2007 | Huang | |
| 7,296,596 B1 * | 11/2007 | Chen | 137/801 |
| 7,753,074 B2 * | 7/2010 | Rosko et al. | 137/625.4 |
| 2004/0069358 A1 | 4/2004 | Knapp et al. | |
| 2004/0084097 A1 | 5/2004 | Bloom et al. | |
| 2006/0016001 A1 | 1/2006 | Zhao | |
| 2006/0174955 A1 | 8/2006 | Huang | |
| 2007/0017585 A1 | 1/2007 | Rosko et al. | |
| 2007/0044850 A1 | 3/2007 | Pieters | |
| 2007/0059995 A1 | 3/2007 | Bloom et al. | |

* cited by examiner

WATER FAUCET WITH JOYSTICK CARTRIDGE

CROSS-REFERENCE TO RELATED APPLICATION

N/A

FEDERALLY SPONSORED RESEARCH OR DEVELOPMENT

N/A

TECHNICAL FIELD

The invention relates to a water faucet with a unique joystick mixing cartridge or valve. More specifically, the cartridge includes novel internal structures, including a moveable intermediate disk, that provides a mixed water outlet that is in the front portion of the faucet to provide a direct path for water to be discharged from the faucet.

BACKGROUND OF THE INVENTION

Single-handle water faucets suitable for commercial and residential use are well-known. These faucets include a base plate, an upwardly extending main body portion, a discharge segment or spout, and a centrally located handle. A mixing valve or cartridge is positioned within the main body and includes a vertically extending joystick that is operably connected to the handle. A hot water line or conduit is connected to a hot water inlet of the cartridge and a cold water line or conduit is connected to a cold water inlet of the cartridge. The cartridge also includes a mixed water outlet, and a discharge line extends from the water outlet through the spout to provide water for discharge. In operation, an operator actuates the handle to discharge water through the spout at a desired temperature and volume. Conventional single-handle water faucets suffer from a number of limitations that negatively affect their performance, durability and cost of manufacture. For example, conventional water faucets locate the mixed water outlet in the rear portion of the cartridge and as a result, the discharge line assumes an unnecessarily long and circuitous path to the spout that compromises durability and installation of the cartridge in the faucet body.

The present invention is provided to solve these limitations and to provide advantages and aspects not provided by conventional faucet mixing valves or cartridges. A full discussion of the features and advantages of the present invention is deferred to the following detailed description, which proceeds with reference to the accompanying drawings.

SUMMARY OF THE INVENTION

The present invention is directed to a water faucet having a main body portion, a discharge spout, a handle that an operator actuates to deliver water at a desired temperature and volume, and an internal cartridge assembly. A hot water line extends through the main body portion and is connected to hot water inlets of the cartridge, and a cold water line extends through the main body portion and is connected to cold water inlets. A water discharge line extends from mixed water outlets of the cartridge through the spout to enable the discharge of water at the temperature and volume selected by the operator.

According to an aspect of the invention, the cartridge assembly includes a housing that defines an internal chamber, a base joined to the housing to enclose the chamber, and a lower disk positioned within the chamber. The cartridge assembly further includes an intermediate disk positioned adjacent the lower disk, an upper disk positioned adjacent the intermediate disk, and a control joystick extending through the housing for connection with the handle. The lower disk includes a hot water inlet, a cold water inlet and a mixed water outlet. The intermediate disk is slidingly positioned on the lower disk whereby it is capable of movement on an upper surface of the lower disk. The intermediate disk has a heart-shaped sealing element that extends radially inward from a lowermost wall. The sealing element comprises a stem extending radially inward from the wall, a first lobe extending from the stem, and a second lobe extending from the stem. The intermediate disk also has a recessed water mixing cavity that has a generally arcuate configuration. The upper disk is positioned adjacent the intermediate disk and has a central aperture. The control joystick assembly includes an elongated shaft that extends through the housing opening for mechanical coupling to the handle, and a depending actuator ball that is received by the upper disk to operably connect the joystick to the upper disk. Consequently, actuation of the handle and joystick results in movement of the upper disk and the intermediate disk.

According to another aspect of the invention, the operator actuates the handle (and the linked joystick assembly) to select the temperature and volume of water discharged from the spout. Therefore, actuation of the handle enables the operator to select between an off position (no water discharge), a hot water discharge position, a warm water discharge position and a cold water discharge position. In general terms, when the cartridge is moved between these various positions, the sealing element sealingly engages the hot water inlet and/or the cold water inlet of the lower disk, varying the relative positioning of the mixing cavity and the mixed water outlet.

For a more complete understanding of the present invention, reference should be had to the accompanying drawings as well as the descriptive matter in which there is illustrated and described the preferred embodiment of the present invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
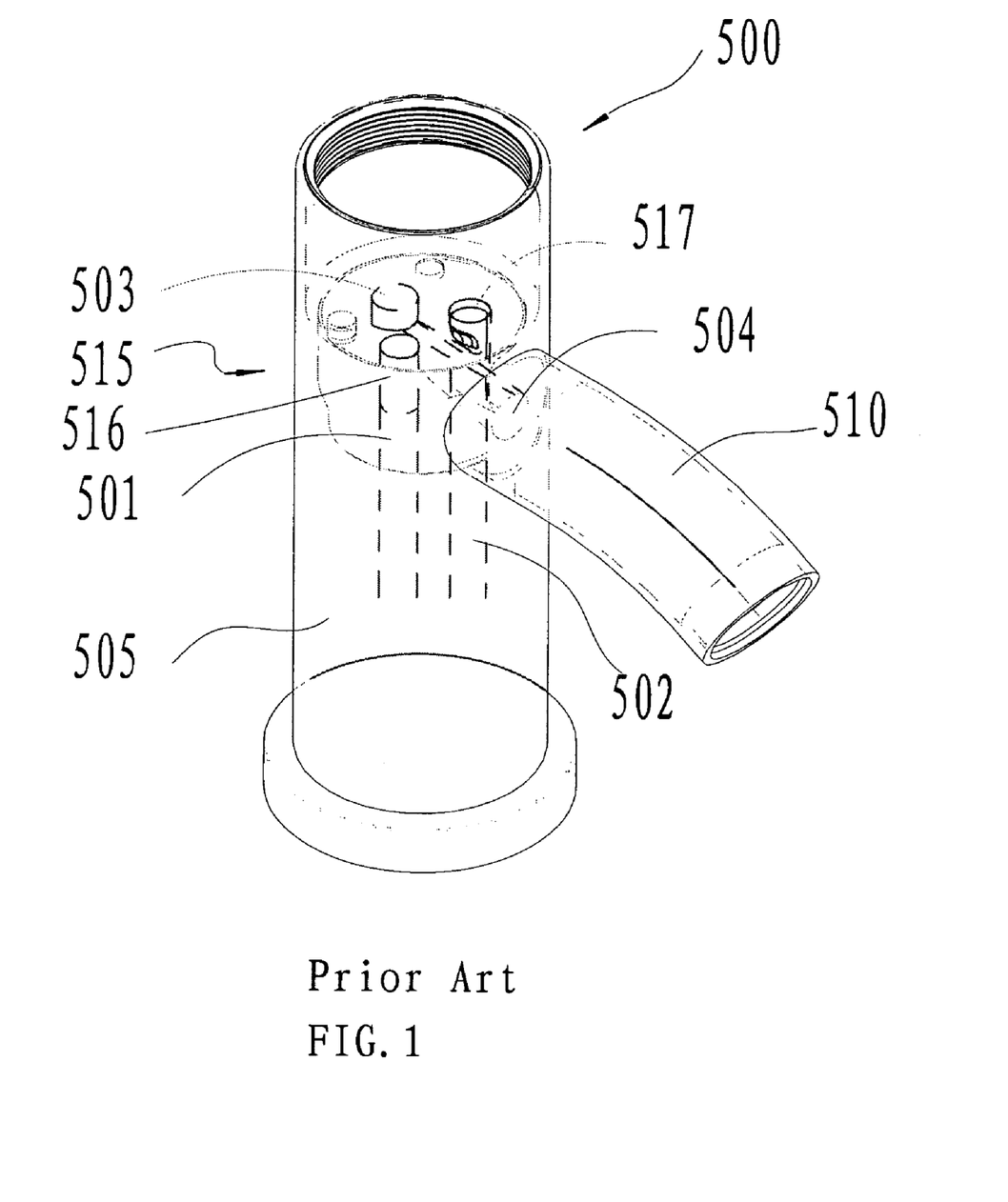
FIG. 1 is a perspective view of a main body, cartridge and discharge spout of a conventional water faucet, showing the cartridge having a mixed water outlet positioned in the rear portion of the main body.

FIG. 1 depicts a conventional faucet 500 that comprises a base plate (not shown), an upwardly extending main body portion 505, a discharge segment or spout 510, and a centrally located handle (not shown). A mixing valve or cartridge 515 is positioned within the main body 505 and is operably connected to the handle. A hot water line or conduit 501 is connected to a hot water inlet 516 of the cartridge and a cold water line or conduit 502 is connected to a cold water inlet 517 of the cartridge 515. A mixed water outlet 503 is located in a rear portion of the cartridge 515, and is directed away from the spout 510, wherein the hot and cold water inlets 516, 517 are positioned between the mixed water outlet 503 and the spout 510. The cartridge 515 has intersecting X and Y axes that define four quadrants, wherein the mixed water outlet 503 is located in a region in both the first and fourth quadrants. A discharge line 504 extends from the water outlet 503 through a substantial extent of the cartridge 515 and to the spout 510 to provide water for discharge.

FIGS. 2-7 show an embodiment of a water faucet 10 of the present invention. The water faucet 10 includes a main body portion 16, a discharge segment or spout 14 and a handle 30 that an operator actuates to deliver water at a desired temperature and volume through the discharge segment 14. The faucet 10 also includes a cartridge assembly 15 positioned within the main body portion 16. A hot water line 11 extends through the main body portion 16 and is connected to hot water inlets 251, 271 of the cartridge 15, and a cold water line 12 extends through the main body portion 16 and is connected to cold water inlets 252, 272. A water discharge line 13 extends from mixed water outlets 253, 273 of the cartridge 15 through the spout 14 to enable the discharge of water at the temperature and volume selected by the operator.

Figure 2:
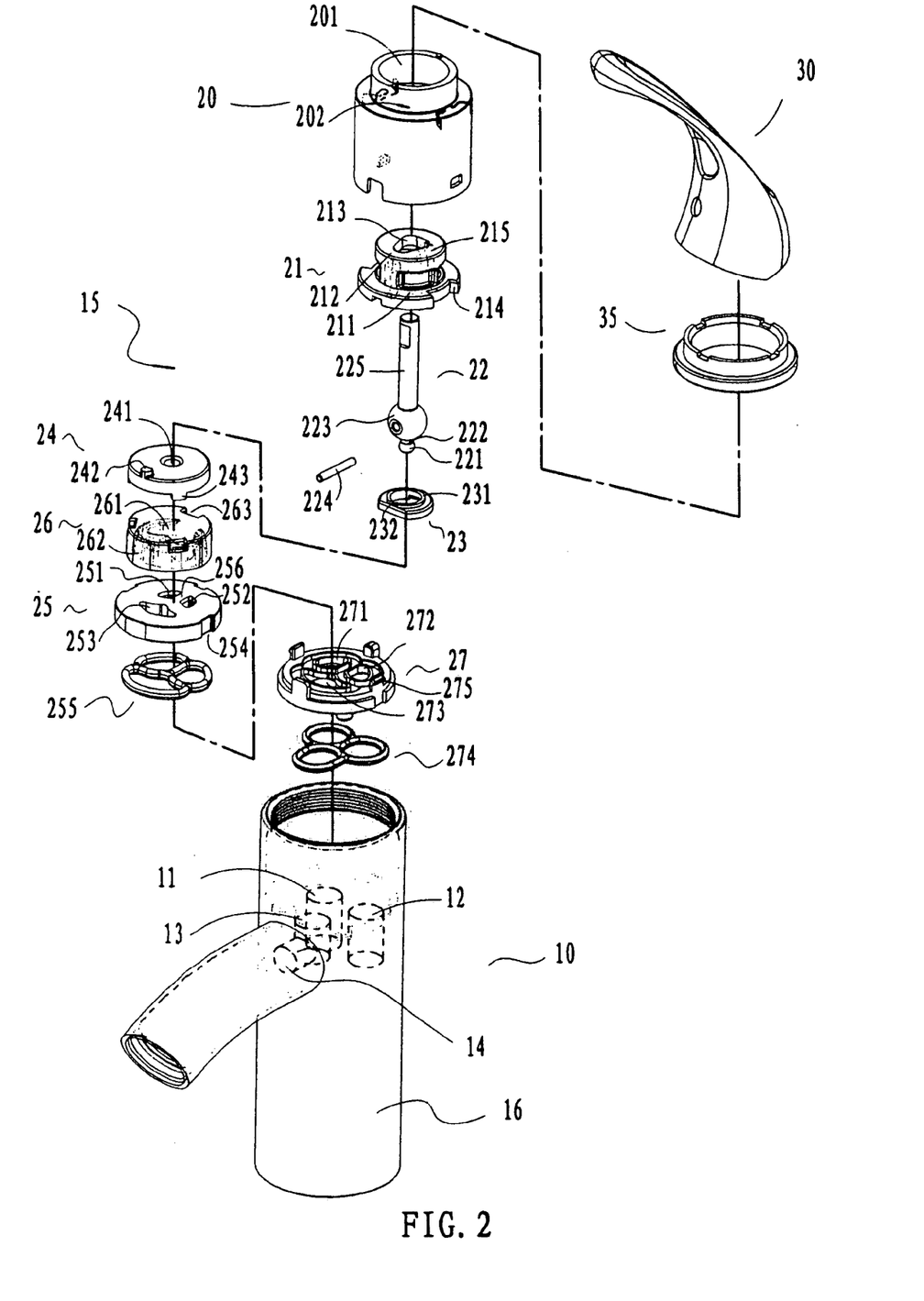
FIG. 2 is an exploded view of the inventive water faucet, showing the various components of the water faucet, including the components of the cartridge.

As may best be seen in FIG. 2, the cartridge assembly 15 includes: a housing 20 with a central opening 201 leading to an internal chamber 202, and a base 27 joined to housing 20 to enclose the chamber 202. The cartridge assembly 15 also includes a lower disk 25 positioned within the chamber 202, an intermediate disk 26 positioned above and adjacent the lower disk 25 within the chamber 202, an upper disk 24 positioned above and adjacent the intermediate disk 26 within the chamber 202. A seat 21 is positioned adjacent the upper disk 24, and a control joystick 22 extends through the housing opening 201 for connection with handle 30. As explained in greater detail below, the intermediate disk 26 has a novel sealing element 261 and a mixing cavity 262 that provide a number of benefits, including a frontal mixed water outlet for a direct outlet flow path through the spout 14.

Referring to FIG. 2, the base 27 includes a hot water inlet opening 271, a cold water inlet opening 272 and a mixed water outlet opening 273. A sealing element or gasket 274 may be affixed to the base 27 about the inlets 271, 272 and outlet 273. The base 27 has an X axis and Y axis that intersect at the center of that base, and that together define four quadrants. The first and fourth quadrants are directed away from the discharge spout 14, and the second and third quadrants are directed towards the discharge spout 14. The cold water inlet 272 resides in the first quadrant, the hot water inlet 271 resides in the fourth quadrant and the mixed water outlet 273 resides in the second and third quadrants.

Figure 4:
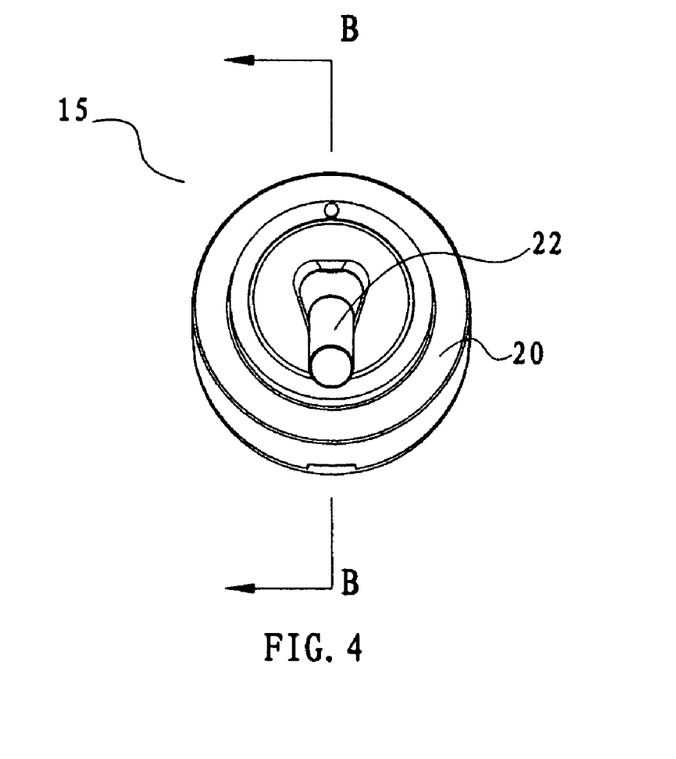
FIG. 4 is a top view of the cartridge in an off position.
Figure 4A:
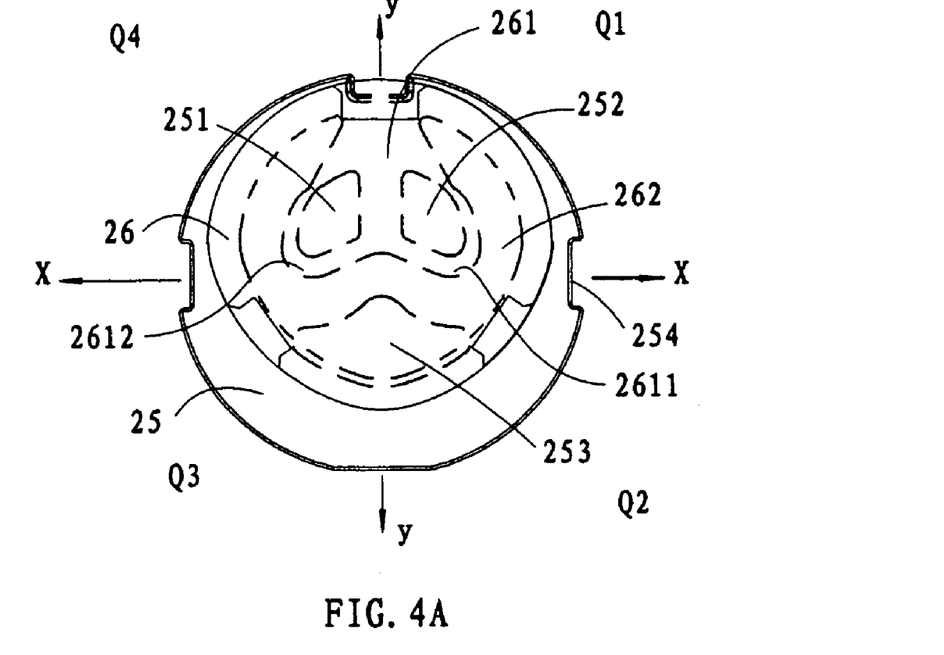
FIG. 4A is a schematic representation of the relative locations of the intermediate disk and a lower disk in the off position.

As may best be seen in FIGS. 2 and 4A, like the base 27, the lower disk 25 includes a hot water inlet 251, a cold water inlet 252 and a mixed water outlet 253. The lower disk 25 has an X axis and Y axis that define four quadrants Q1-Q4, wherein the first and fourth quadrants Q1, Q4 are directed away from the discharge spout 14, and the second and third quadrants Q2, Q3 are directed towards the discharge spout 14. The cold water inlet 252 resides in the first quadrant Q1, the hot water inlet 251 resides in the fourth quadrant Q4 and the water outlet 253 resides in the second and third quadrants Q2, Q3. The lower disk 25 has at least one spoke 256 residing between the inlets 251, 252 and outlet 253. The lower disk 25 includes at least one notch 254 that receives a projection 275 of the base 27 to secure the lower disk 25 to the base 27. A gasket 255 may be employed between the base 27 and the lower disk 25 to seal the various water inlets 251, 252, 271, 272 and outlets 253, 273.

Figure 3:
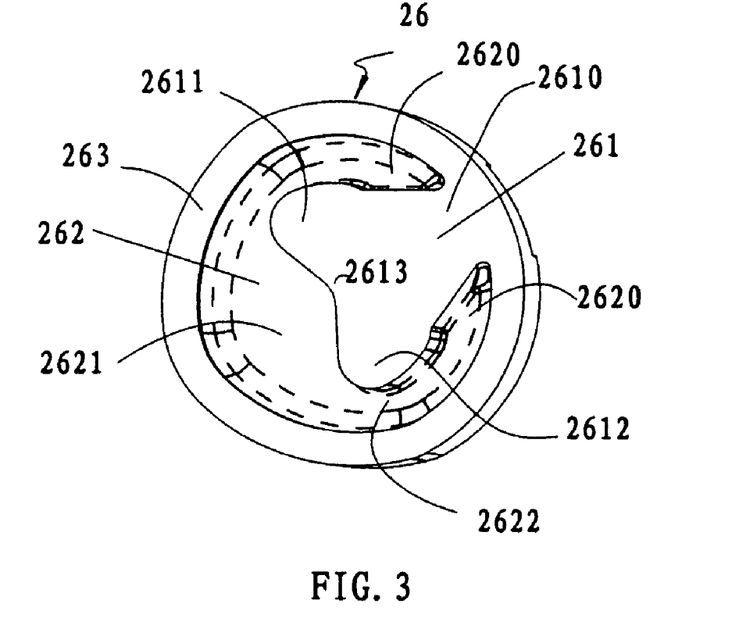
FIG. 3 is a bottom perspective view of an intermediate disk of the cartridge, showing the intermediate disk having an arcuate mixing cavity and a dual lobe sealing element.

The intermediate disk 26 is slidingly positioned on the lower disk 25, meaning that the intermediate disk 26 is capable of movement on an upper surface of the lower disk 25 within the chamber 202. As shown in FIG. 3, the intermediate disk 26 has a heart-shaped sealing element 261 that extends radially inward from a lowermost wall 263. Described differently, the sealing element 261 comprises a stem 2610 extending radially inward from the wall 263, a first lobe 2611 extending from the stem 2610, and a second lobe 2612 extending from the stem 2610. A curvilinear transition segment 2613 is positioned between the two lobes 2611, 2612. As explained in greater detail below, the sealing element 261 slidingly engages the upper surface of the lower disk during operation of the faucet 10. The intermediate disk 26 also has a recessed water mixing cavity 262 extending inward from the lowermost wall 263. The mixing cavity 262 has a generally arcuate configuration due to its relationship with the wall 263 and the sealing element 261. Specifically, the cavity 262 has an outer boundary defined by the curvilinear wall 263 and an inner boundary defined by the complex curves of the periphery of the sealing element 261. Consequently, the two end points 2620 of the cavity 262 have a notched configuration, and the central portion 2621 of the cavity 262 has a bulbous configuration. The narrowest segments of the cavity 262 are found at the intermediate portions 2622, which is caused by the protruding lobe 2611, 2612. Preferably, the intermediate disk 26 has a diameter less than a diameter of the lower disk 25 to facilitate movement within the chamber 202.

As best seen in FIG. 2, the upper disk 24 is positioned adjacent the intermediate disk 26 within the chamber 202. The upper disk 24 has a central aperture 241, and at least one downwardly extending engaging member 243 that is received within a recess 263 of the disk 26 to operably couple the upper disk 24 to the intermediate disk 26. The upper disk 24 also has an upwardly directed finger 242 that is received by a recess 211 of the seat 21 to operably couple the disk 24 to the seat 21. As may be seen in FIG. 2, the seat 21 is positioned adjacent the upper disk 24 within the chamber 202. The seat 21 has an upwardly extending ring portion 212 with a top wall 215 having a central opening 213 that receives an extent of the joystick 22. The seat 21 has a peripheral notch 214 that receives a cooperating structure of the housing 20.

The control joystick assembly 22 includes a number of components for operative interaction with the handle 30 and the other components of the cartridge 15. The joystick assembly 22 includes an elongated shaft 225 that extends through both the seat 21 and the housing opening 201 for mechanical coupling to the handle 30, a rotary ball 223, a link 222, and a post 224. The joystick assembly 22 also includes a depending actuator ball 221 that is received by the opening 241 of the upper disk 24 to operably connect the joystick 22 to the upper disk 24. Consequently, actuation of the handle 30 and joystick 22 results in movement of the upper disk 24 and the intermediate disk 26 whereby the position of the mixing cavity 262 relative to the hot and cold water inlets 251, 252 and the water outlet 253 is varied. A post 224 and a fixing element 23, including a flange 231 and an opening 232, receive an extent of the actuator ball 221 and facilitate operable connection of the joystick 22 with the upper disk 24. A nut 35 retains the cartridge 15 in the main body 16 of the faucet 10 and operably secures the handle 30 to the main body 16.

During operation of the faucet 10, the operator actuates the handle 30 (and linked joystick assembly 22) to select the temperature and volume of water discharged from the spout 14. Therefore, actuation of the handle 30 enables the operator to select between an off position (no water discharge), a hot water discharge position, a warm water discharge position and a cold water discharge position. Generally speaking, when the cartridge 15 is moved between these various positions, the sealing element 261 sealingly engages the hot water inlet 251 and/or the cold water inlet 252 of the lower disk 25, and the relative positioning of the mixing cavity 262 and the mixed water outlet 253 varies. While the lower disk 25 and the base 27 remain stationary, the movement of the intermediate disk 26 results from movement of the handle 30 and the joystick 22 which is operably connected to both the upper disk 24 and the intermediate disk 26 by the structures explained above.

Figure 4B:
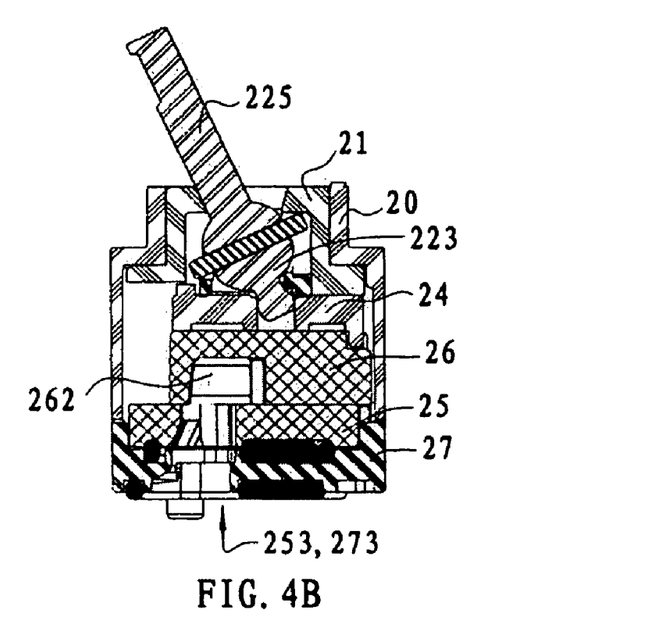
FIG. 4B is a cross-section of the cartridge taken along line B-B of FIG. 4, showing the cartridge in the off position.

In the off or closed water position of FIGS. 4, 4A and 4B, the intermediate disk 26 is moved relative to the lower disk 25 such that the sealing element 261 is positioned over both the hot water and cold water inlets 251, 252 to prevent the flow of water into the arcuate mixing cavity 262. Referring to the schematic view of FIG. 4A and the cross-sectional view of FIG. 4B, the arcuate mixing cavity 262 is aligned with the water outlet 253 of the lower disk 25. Also in the off position, the intermediate disk 26 is positioned relative to the lower disk 25 such that the first lobe 2611 of the sealing element 261 is positioned over the cold water inlet 252 to prevent the flow of water into the mixing cavity 262, and the second lobe 2612 of the sealing element 261 is positioned over the hot water inlet 251 to prevent the flow of water into the mixing cavity 262. Lastly, an extent of the periphery of the intermediate disk 26 is coincident with an extent of the periphery of the lower disk 25 in the region between the first and fourth quadrants Q1, Q4 (see FIG. 4A).

Figure 5:
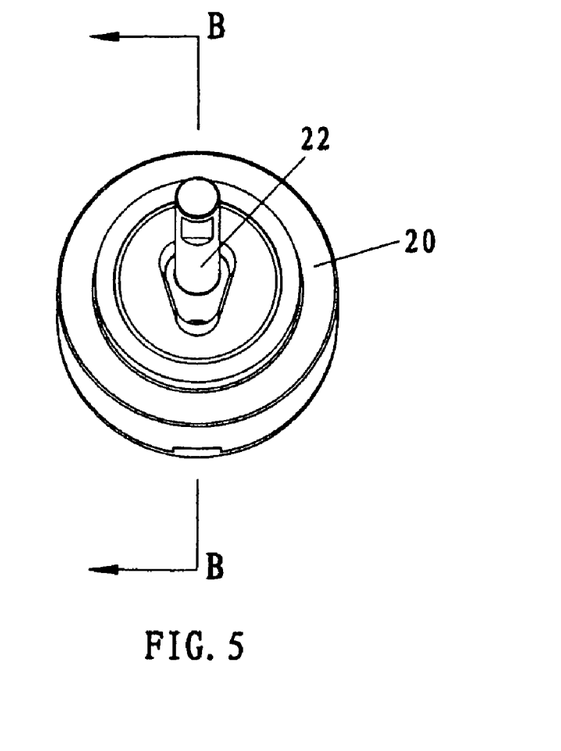
FIG. 5 is a top view of the cartridge in a warm water discharge position.
Figure 5A:
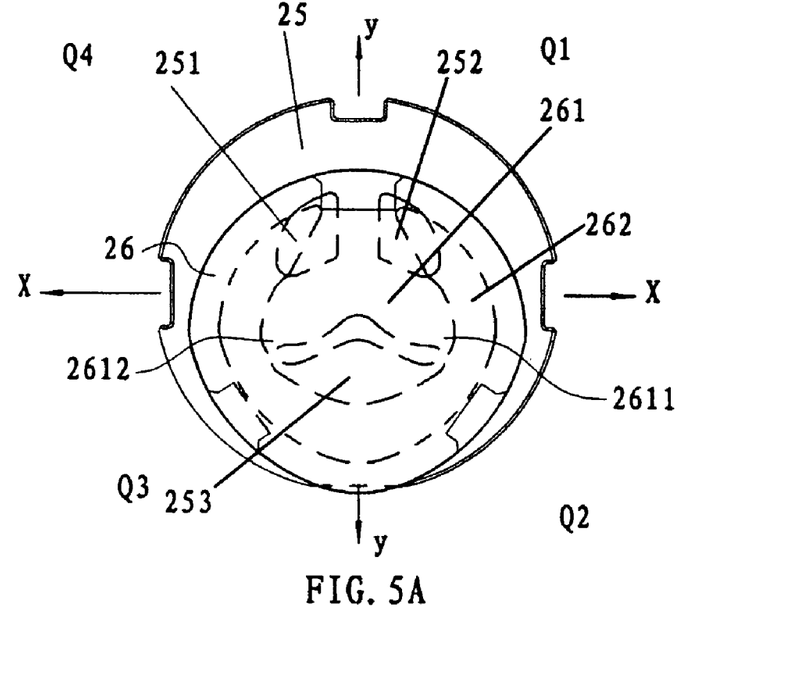
FIG. 5A is a schematic representation of the relative locations of the intermediate disk and a lower disk in the warm water position.
Figure 5B:
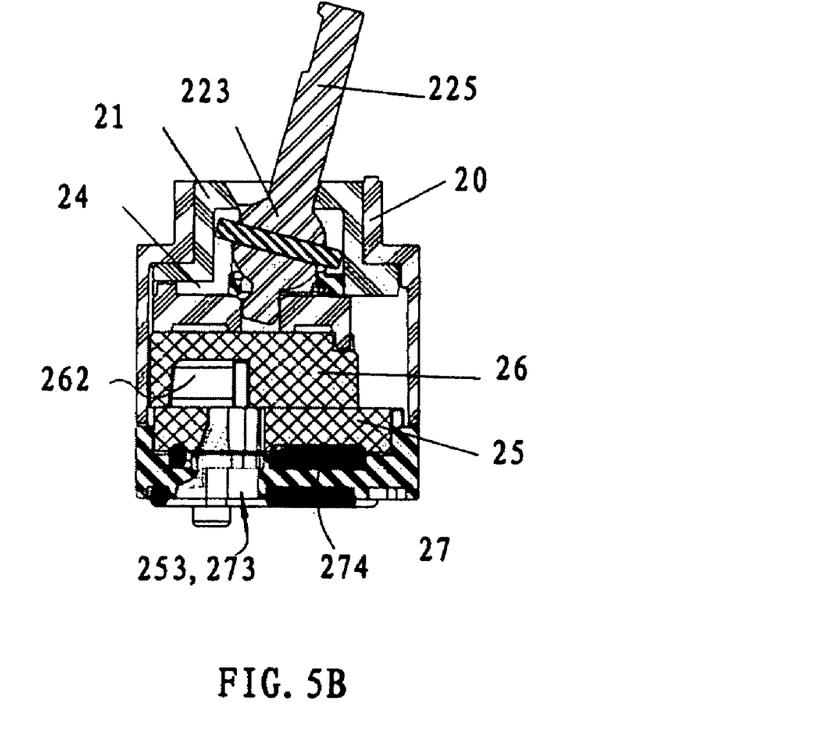
FIG. 5B is a cross-section of the cartridge taken along line B-B of FIG. 5, showing the cartridge in the warm water position

In the warm water position of FIGS. 5, 5A and 5B, the intermediate disk 26 is moved relative to the lower disk 25 such that the arcuate mixing cavity 262 is aligned with a portion of both the hot water and cold water inlets 251, 252 to allow for the entry of both cold and hot water into the mixing cavity 262, and the water outlet 253 to allow for the discharge of warm water from the mixing cavity 262 through the lower disk 25 and the base 27 and along a direct outlet flow path through the discharge line 13 to the spout 14. In the warm water discharge position, the sealing element 261 is positioned over a portion of both the hot water and cold water inlets 251, 252 to reduce the volumetric flow of hot and cold water into the arcuate mixing cavity 262. Further, the stem 2610 of the sealing element 261 is positioned over a portion of both the hot and cold water inlets 251, 252 to reduce the volumetric flow of hot and cold water into the mixing cavity 262. Lastly, an extent of the periphery of the intermediate disk 26 is coincident with a periphery of the lower disk 25 in the region between the second and third quadrants (see FIG. 5A).

Figure 6:
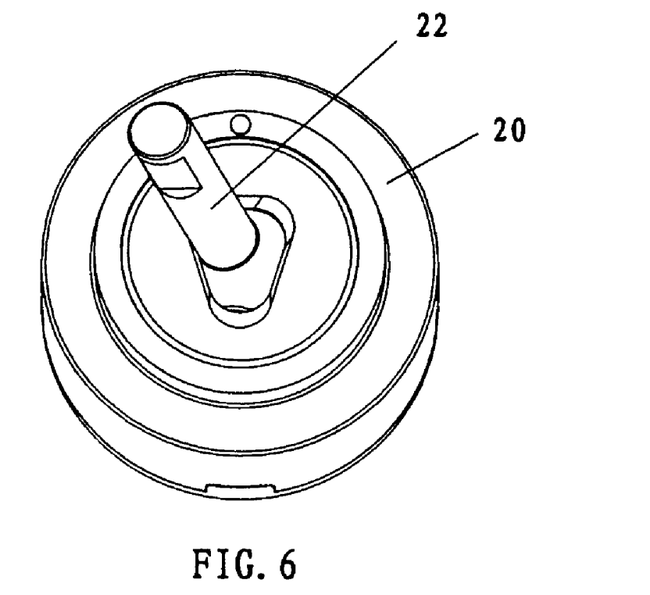
FIG. 6 is a top view of the cartridge in a hot water discharge position.
Figure 6A:
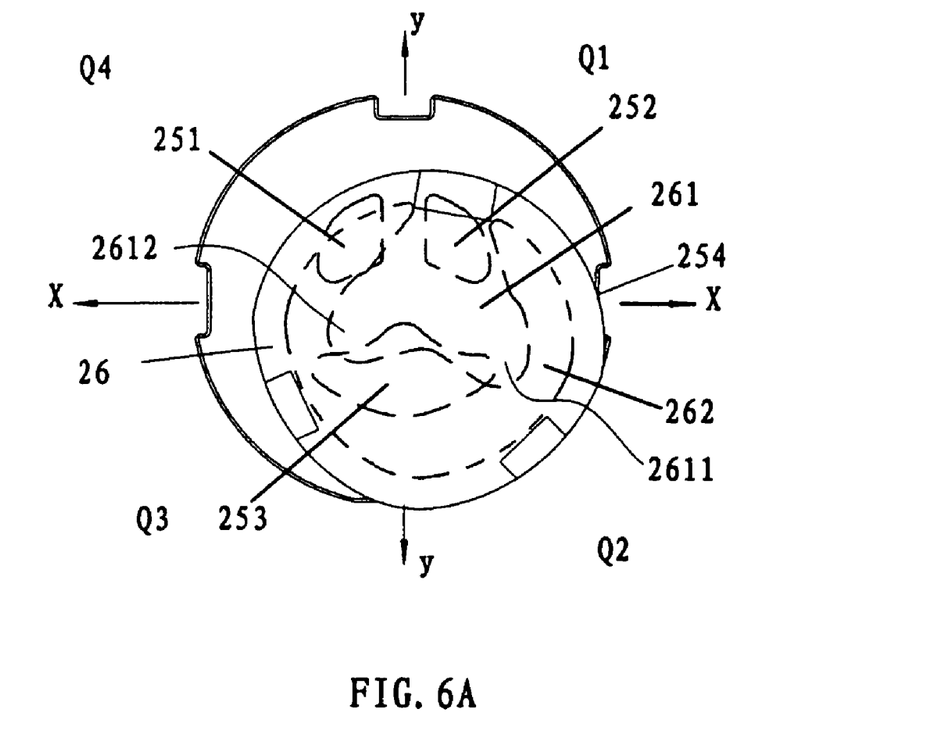
FIG. 6A is a schematic representation of the relative locations of the intermediate disk and a lower disk in the hot water position.

In the hot water position of FIGS. 6 and 6A, the intermediate disk 26 is moved relative to the lower disk 25 such that the arcuate mixing cavity 262 is aligned with both the hot water inlet 251 to allow for the entry of hot water into the mixing cavity 262 and the mixed water outlet hole 253 to allow for the discharge of hot water through the lower disk 25. In the hot water discharge position, the sealing element 261 is positioned over the cold water inlet 252 to prevent the entry of cold water into the arcuate mixing cavity 262. Also, the stem 2610 and the first lobe 2611 of the sealing element 261 are positioned over the cold water inlet 252 to prevent the entry of cold water into the arcuate mixing cavity 262. Finally, an extent of the periphery of the intermediate disk 26 is coincident with an extent of the periphery of the lower disk 25 in the second quadrant (see FIG. 6A).

Figure 7:
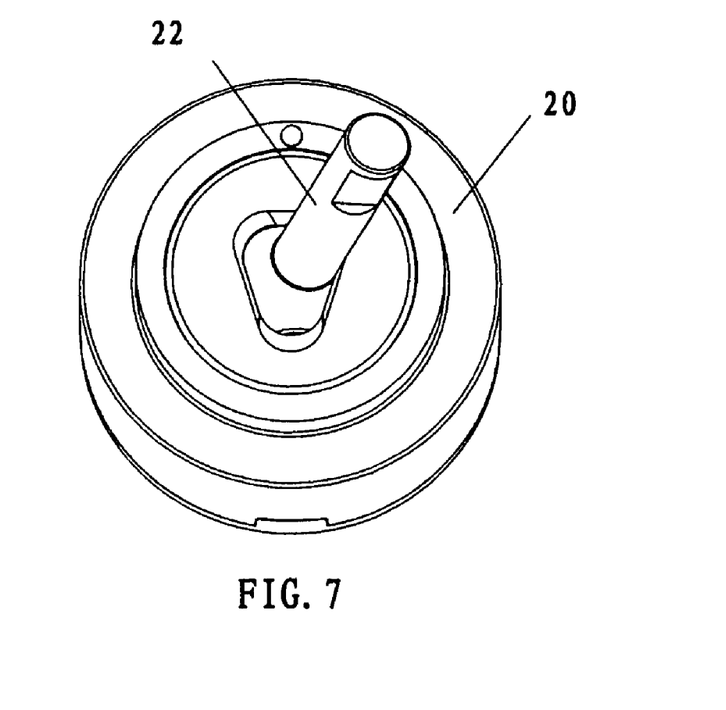
FIG. 7 is a top view of the cartridge in a cold water discharge position.
Figure 7A:
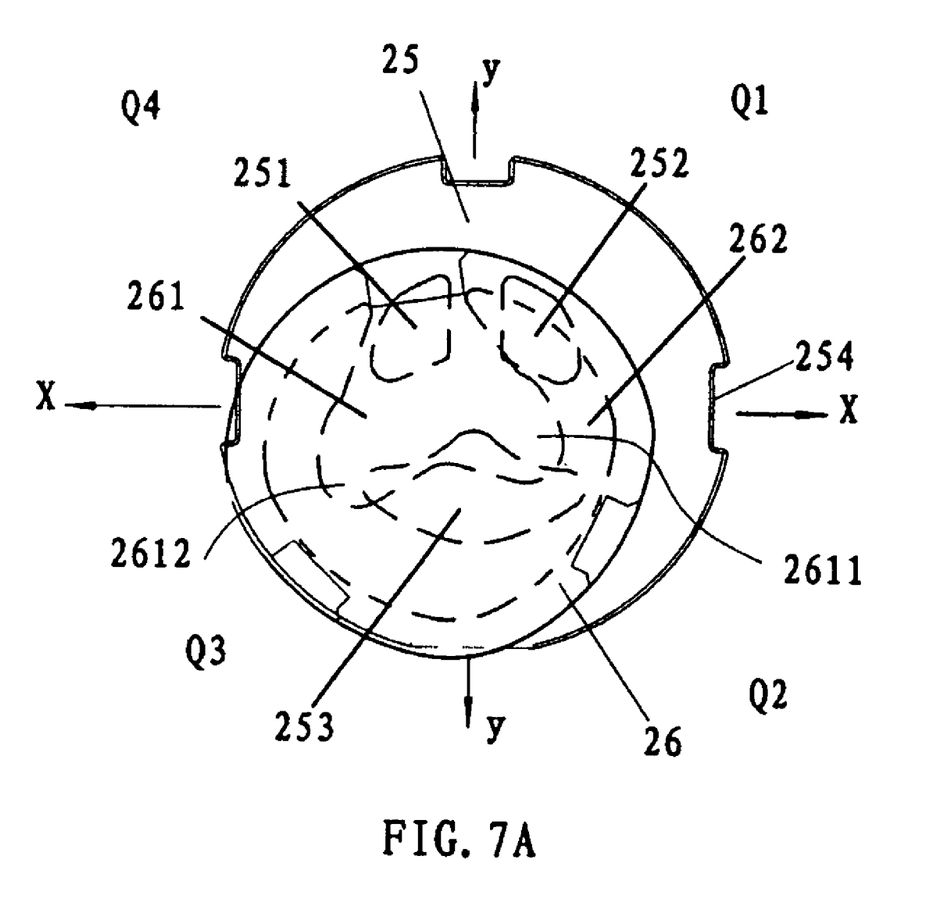
FIG. 7A is a schematic representation of the relative locations of the intermediate disk and a lower disk in the cold water position.

In the cold water position of FIGS. 7 and 7A, the intermediate disk 26 is moved relative to the lower disk 25 such that the arcuate mixing cavity 262 is aligned with both the cold water inlet 252 to allow for the entry of cold water into the mixing cavity 262 and the mixed water outlet hole 253 to allow for the discharge of cold water from the mixing cavity 262 through the lower disk 25. In the cold water discharge position, the sealing element 261 is positioned over the hot water inlet 251 to prevent the entry of hot water into the arcuate mixing cavity 262. Specifically, the stem 2610 and the second lobe 2612 of sealing element 261 are positioned over the hot water inlet 251 to prevent the entry of hot water into the arcuate mixing cavity 262. Lastly, an extent of the periphery of the intermediate disk 26 is coincident with an extent of the periphery of the lower disk 25 in the third quadrant (see FIG. 7A).

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:
1. A water faucet comprising:
  a faucet having a main body portion, a discharge segment and a handle that an operator actuates to deliver water at a desired temperature through the discharge segment;
  a cartridge assembly positioned within the main body portion, the cartridge assembly including:
    a housing defining an internal chamber;
    a lower disk positioned within the chamber, the lower disk having a cold water inlet, a hot water inlet and a mixed water outlet;

an intermediate disk positioned adjacent the lower disk within the chamber, the intermediate disk having a recessed mixing cavity extending inward from a lowermost wall that slidingly contacts the lower disk, the intermediate disk further having a dual lobe heart-shaped sealing element that extends radially inward from a side wall to provide the mixing cavity with an arcuate configuration, the intermediate disk having a diameter that is less than a diameter of the lower disk;

an upper disk positioned adjacent the intermediate disk within the chamber, the upper disk having a central aperture and at least one engaging member that operably couples the upper disk to the intermediate disk;

a seat positioned adjacent the upper disk within the chamber, the seat having a central opening;

a joystick having an shaft extending through the seat opening and through the housing for connection with handle, the joystick further having a depending actuator that is received in the upper disk aperture to operably connect the joystick to the upper disk; and, wherein actuation of the handle and joystick results in movement of the upper disk and the intermediate disk whereby the position of the mixing cavity relative to the hot and cold water inlets and the water outlet is varied; and wherein when an operator moves the handle to attain a warm water discharge position, the intermediate disk is moved relative to the lower disk such that the arcuate mixing cavity is aligned with (a) a portion of both the cold water and hot water inlets to allow for the entry and simultaneous mixing of both cold and hot water into the mixing cavity, and (b) the water outlet hole of the lower disk to allow for the discharge of warm water from the mixing cavity.

2. The water faucet of claim 1, wherein the sealing element of the intermediate disk has a lowermost surface that sealingly engages one of the hot water inlet and the cold water inlet when the joystick is moved between a hot water discharge position and a cold water discharge position.

3. The water faucet of claim 1, wherein when an operator moves the handle to attain a cold water discharge position, the intermediate disk is moved relative to the lower disk such that the arcuate mixing cavity is aligned with both the cold water inlet to allow for the entry of cold water into the mixing cavity and the mixed water outlet hole of the lower disk to allow for the discharge of cold water from the mixing cavity.

4. The water faucet of claim 3, wherein in the cold water discharge position, the sealing element of the intermediate disk is positioned over the hot water inlet to prevent the entry of hot water into the arcuate mixing cavity.

5. The water faucet of claim 1, wherein when an operator moves the handle to attain a hot water discharge position, the intermediate disk is moved relative to the lower disk such that the arcuate mixing cavity is aligned with both the hot water inlet to allow for the entry of hot water into the mixing cavity and the mixed water outlet hole of the lower disk to allow for the discharge of hot water from the mixing cavity.

6. The water faucet of claim 5, wherein in the hot water discharge position, the sealing element of the intermediate disk is positioned over the cold water inlet to prevent the entry of cold water into the arcuate mixing cavity.

7. The water faucet of claim 1, wherein in the warm water discharge position, the sealing element of the intermediate disk is positioned over a portion of both the cold water and hot water inlets to reduce the volumetric flow of hot and cold water into the arcuate mixing cavity.

8. The water faucet of claim 1, wherein when an operator moves the handle to attain a closed water discharge position, the intermediate disk is moved relative to the lower disk such that (a) the sealing element is positioned over both the cold water and hot water inlets to prevent the flow of water into the arcuate mixing cavity, and (b) the arcuate mixing cavity is aligned with the water outlet hole of the lower disk.

* * * * *